(12) United States Patent
Burton

(10) Patent No.: US 7,960,881 B2
(45) Date of Patent: Jun. 14, 2011

(54) ELECTRIC MOTOR HAVING DRAINAGE MEANS

(75) Inventor: Stephen J. Burton, Fenton, MO (US)

(73) Assignee: Nidec Motor Corporation, St. Louis, MO (US)

( * ) Notice: Subject to any disclaimer, the term of this patent is extended or adjusted under 35 U.S.C. 154(b) by 318 days.

(21) Appl. No.: 12/252,060

(22) Filed: Oct. 15, 2008

(65) Prior Publication Data

US 2010/0090551 A1 Apr. 15, 2010

(51) Int. Cl.
*H02K 5/10* (2006.01)
*H02K 5/00* (2006.01)
*H02K 7/16* (2006.01)
*F04B 35/04* (2006.01)

(52) U.S. Cl. ....... 310/88; 310/89; 310/157; 417/423.11; 417/424.1

(58) Field of Classification Search ............ 310/88, 310/87–89, 157; 417/231, 424, 423.11, 424.1
See application file for complete search history.

(56) References Cited

U.S. PATENT DOCUMENTS

| | | | |
|---|---|---|---|
| 4,535,262 A * | 8/1985 | Newberg | 310/88 |
| 4,689,511 A * | 8/1987 | Baker et al. | 310/88 |
| 4,904,166 A | 2/1990 | Wasemann | |
| 4,992,690 A * | 2/1991 | Baker | 310/89 |
| 5,232,350 A | 8/1993 | Richardson | |
| 5,263,825 A | 11/1993 | Doolin | |
| 5,326,235 A | 7/1994 | Bruhn | |
| 2002/0157391 A1 | 10/2002 | Ohashi et al. | |
| 2004/0241009 A1 | 12/2004 | Dinkel et al. | |
| 2006/0099090 A1 | 5/2006 | Kramp et al. | |

FOREIGN PATENT DOCUMENTS

JP 2003074464 A 3/2003

OTHER PUBLICATIONS

Karassik et al., "Pump Handbook", 2001, McGraw-Hill Professional, 3rd Edition, 2001; Online Jun. 4, 2008, http://books.google.com/books?id=yU5TyJrOMF8C.

* cited by examiner

*Primary Examiner* — Quyen Leung
*Assistant Examiner* — Jose A Gonzalez Quinones
(74) *Attorney, Agent, or Firm* — Thompson Coburn LLP

(57) ABSTRACT

An electric motor comprises a stator, a rotor, and an interface plate. The interface plate is fixed to the stator and is configured to couple the electric motor to a pump. The interface plate comprises a shaft opening, a cavity, a ventilation passageway, a fluid discharge portion, a drainage passageway, and an upwardly extending surface. The rotor shaft extends horizontally through the shaft opening. The cavity is in communication with the shaft opening. The ventilation passageway extends upward from the cavity and is in communication with the cavity and with the ambient air. The drainage passageway is in communication with and extends downward from the cavity. The drainage passageway is configured to channel liquid downward from the cavity and to the fluid discharge portion. The upwardly extending surface is positioned where the upwardly extending surface will inhibit liquid from migrating from the fluid discharge portion to the stator.

15 Claims, 4 Drawing Sheets

ELECTRIC MOTOR HAVING DRAINAGE MEANS

CROSS-REFERENCE TO RELATED APPLICATIONS

Not Applicable

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

This invention pertains generally to electric motors. More specifically, this invention pertains to an electric motor that is adapted to be coupled to a liquid pump and that prevents liquid seepage from the pump from reaching the motor's stator.

2. General Background

Liquid pumps, such as those used in appliances, are typically coupled to and driven by electric motors. Liquid seepage from such a pump that migrates toward an adjacent electric motor can negatively impact the efficient operation of such an electric motor. For this reason, the electric motor and pump are typically oriented relative to each other in a manner such that the electric motor is not directly beneath the pump. In some cases, design constraints require the electric motor and pump to be positioned side-by-side. While positioning the electric motor to the side, rather than beneath the pump, inhibits seepage into the motor, liquid seepage from the pump bearings still may travel along the rotor shaft to be drawn into the stator.

In view of this concern, it is known to provide an electric motor with a liquid drainage cavity that is specifically configured to prevent liquid that has seeped past the rotor shaft bearing of the pump from being drawn by capillary action into the stator of the electric motor. The cavity is typically formed in the interface plate of the electric motor and encircles the rotor shaft in a manner providing an annular void around a portion of the shaft. The cavity thereby provides a place for seeped liquid to migrate and prevents capillary action from drawing the liquid into the stator, which would likely occur if there was little space around the shaft. Assuming the liquid seepage is slight, the cavity can serve as a reservoir for such liquid and thereby prevent the liquid from migrating into the stator. However, it is also known to provide the interface plate with a drainage passageway extending down from the cavity in an effort to drain liquid from the cavity so as to prevent the cavity from filling with liquid. Nonetheless, liquid draining from such a drainage passageway can create a partial vacuum in cavity which can inhibit further drainage of liquid from the cavity. Additionally, liquid draining from such a drainage passageway tends to collect on the bottom of the interface plate and run along bottom of the stator, where it can negatively impact the efficient operation of the electric motor.

SUMMARY OF THE INVENTION

The present invention provides an improved interface plate that reduces the possibility that liquid seeped from the pump will migrate to the stator. By providing a ventilation passageway to the cavity of the interface plate, liquid draining from a drainage passageway of the interface plate will not create a partial vacuum in the cavity and therefore liquid can more easily drain from the cavity. Additionally, by configuring the interface plate such that any liquid drained from the drainage passageway would have to travel up a surface before reaching the stator, the risk of drained liquid migrating to the stator is reduced. Thus, there are several aspects of the invention.

In one aspect of the invention, an electric motor comprises a stator, a rotor, and an interface plate. The rotor has a rotor shaft. The interface plate is fixed to the stator and is configured and adapted to couple the electric motor to a fluid pump. The interface plate comprises a shaft opening, a cavity, a ventilation passageway, a fluid discharge portion, a drainage passageway, and an upwardly extending surface. The shaft opening extends through the interface plate. The rotor shaft extends horizontally through the shaft opening. The cavity is in fluid communication with the shaft opening. The ventilation passageway extends upward from the cavity and is in fluid communication with the cavity and with an environment that is external to the interface plate. The drainage passageway extends downward from the cavity and is in fluid communication with the cavity. The drainage passageway is configured and adapted to channel liquid downward from the cavity and to the fluid discharge portion via gravity. The upwardly extending surface extends upwardly from the discharge portion and is positioned where the upwardly extending surface will inhibit liquid from migrating from the fluid discharge portion to the stator.

In another aspect of the invention, an electric motor comprises a stator, a rotor, and an interface plate. The rotor has a rotor shaft. The interface plate comprises opposite front and rear sides, a shaft opening, a cavity, a ventilation channel, and a drainage channel. The interface plate is mounted to the stator in a manner such that the rear side of the interface plate faces the stator. The shaft opening extends through the interface plate from the rear side to the front side of the interface plate. The rotor shaft extends horizontally through the shaft opening. The cavity extends partially into the interface plate from the front side of the interface plate. At least a portion of the cavity is beneath the shaft opening. The cavity is in fluid communication with the shaft opening. The ventilation channel extends at least partially through the interface plate from the front side of the interface plate and extends upward from the cavity. The ventilation channel is in fluid communication with the cavity and with an environment that is external to the interface plate. The drainage channel extends partially through the interface plate from the front side of the interface plate and extends downward from the cavity. The drainage channel is in fluid communication with the cavity and with the environment.

For purposes of describing the invention, the electric motors are described herein as being in an orientation such that their rotor axes extend horizontally. Nonetheless, it should be appreciated that when the electric motor is utilized, the orientation of the rotor shaft may be other than horizontal. Thus, the orientations described herein a merely for the purpose of describing relative orientation of various features of the invention.

Further features and advantages of the present invention, as well as the operation of the invention, are described in detail below with reference to the accompanying drawings.

Figure 1:
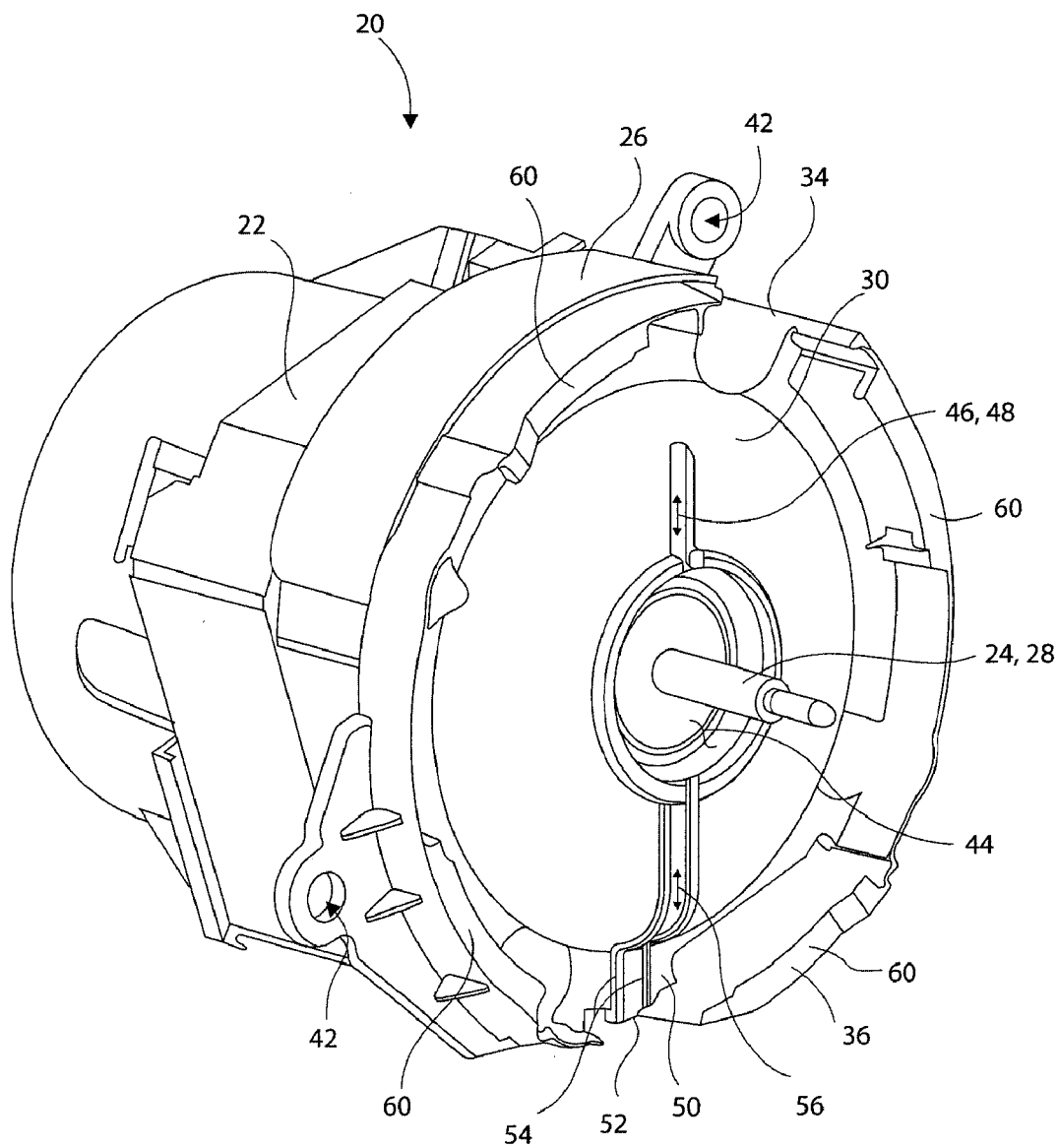
FIG. 1 is a perspective view of one embodiment of an electric motor in accordance with the invention, showing the front, top, and left side of the electric motor.
Figure 2:
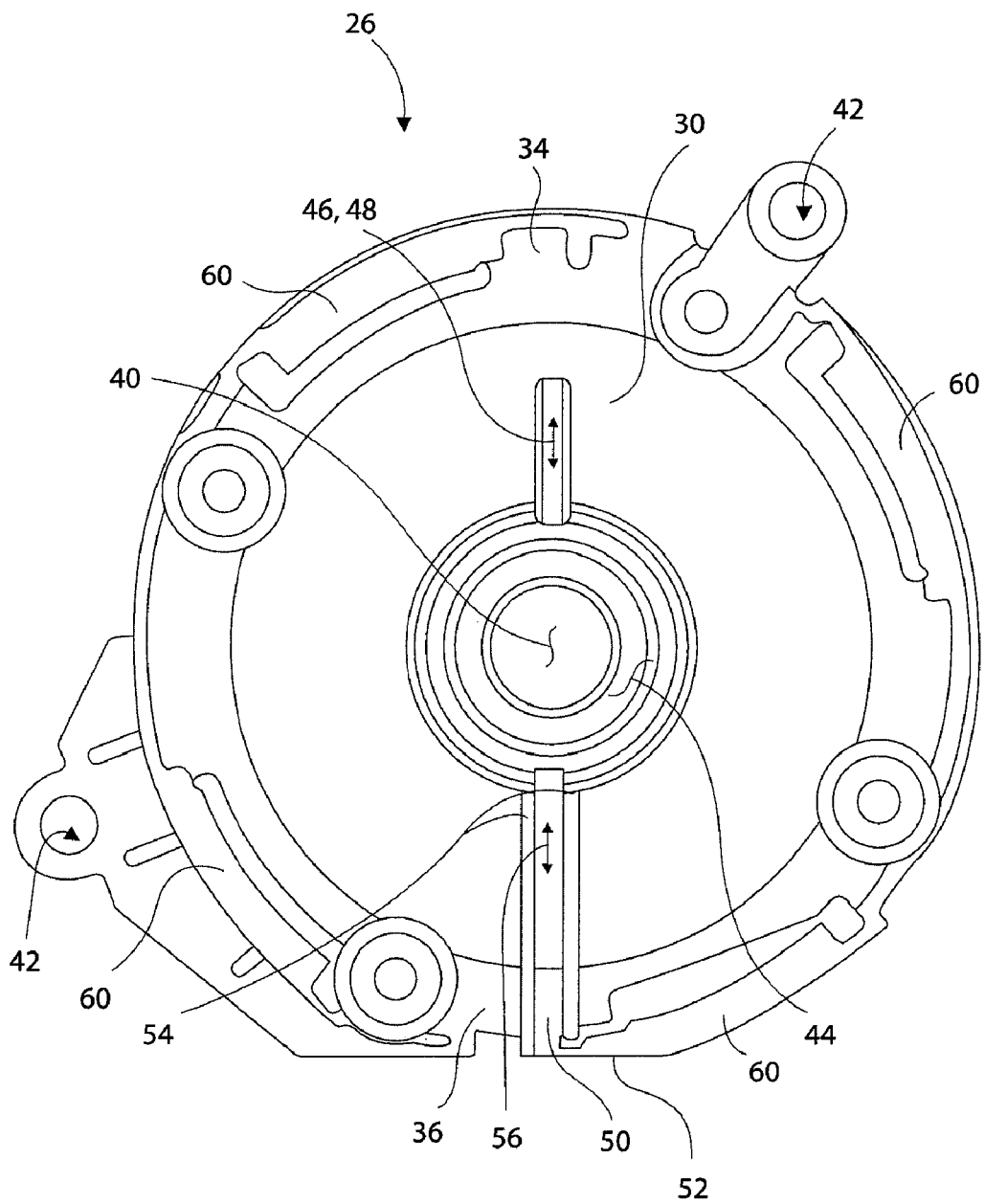
FIG. 2 is a front view of the interface plate of the electric motor shown in FIG. 1.
Figure 3:
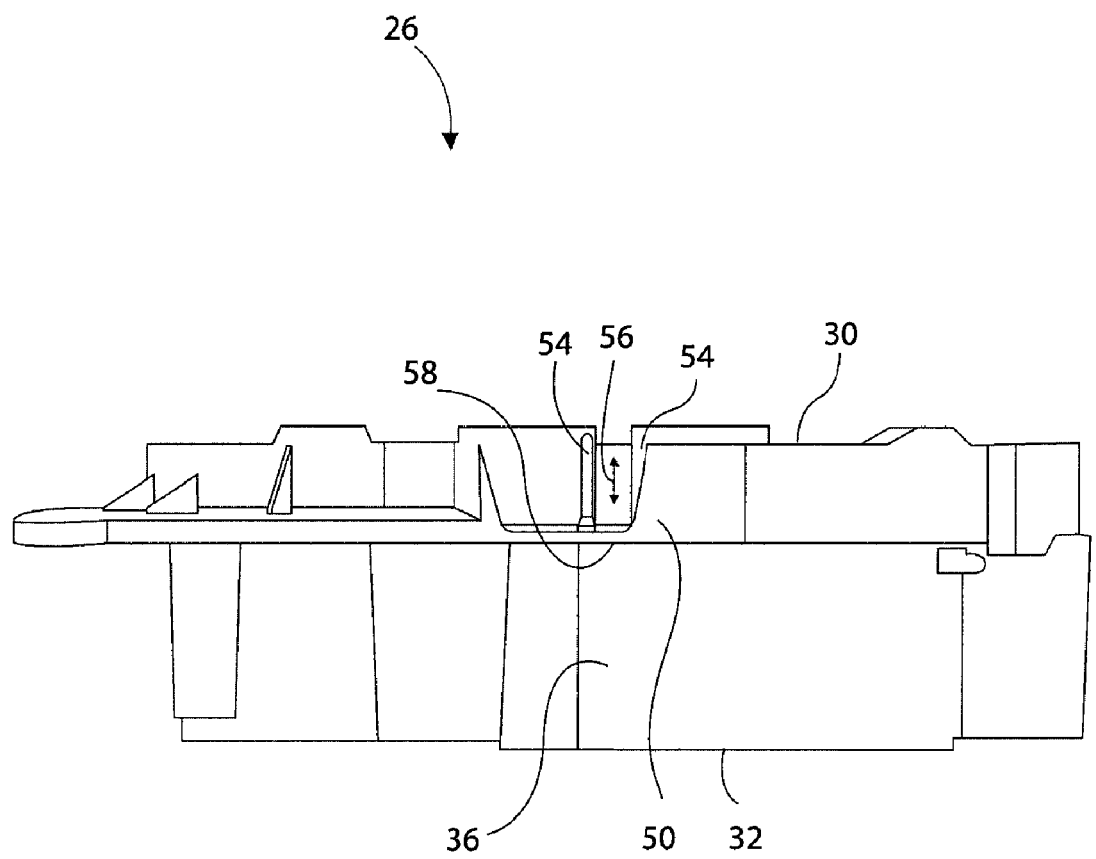
FIG. 3 is a bottom view of the interface plate shown in FIG. 2.

Reference numerals in the written specification and in the drawing figures indicate corresponding items.

DETAILED DESCRIPTION

Figure 4:
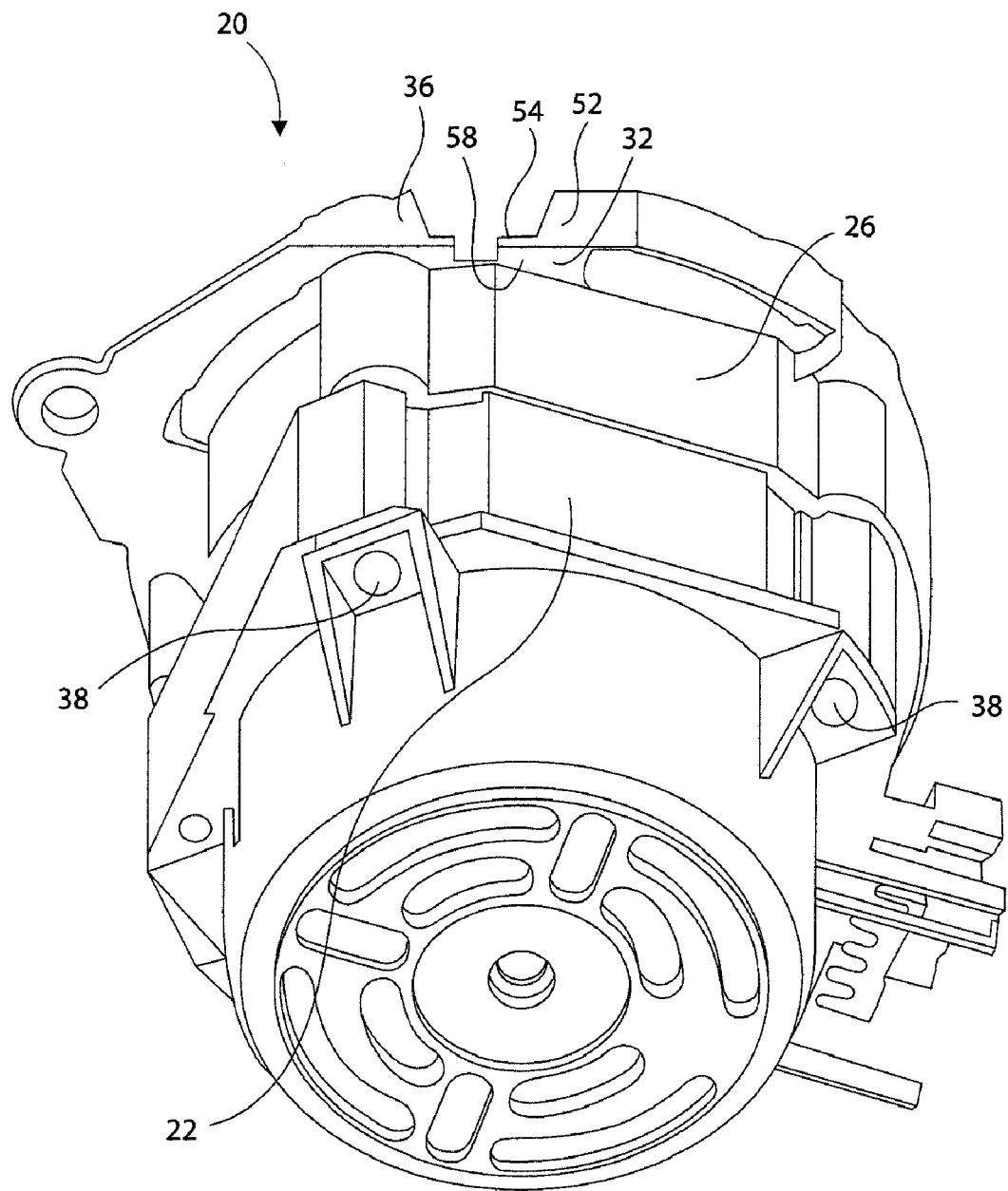
FIG. 4 is a perspective view of the electric motor shown in FIG. 1, showing the rear and bottom of the electric motor.

An embodiment of an electric motor in accordance with the invention is shown in FIGS. 1 and 4. The electric motor 20 comprises a stator 22, a rotor 24, and an interface plate 26. The stator 22 surrounds most of the rotor 24 and is configured to be fixed in place within an appliance. The rotor 24 is rotationally mounted to the stator 22 and comprises a rotor shaft 28 that extends from the stator. Although the lead line for the stator 22 is shown in the drawing figures extending to the lamination stack of the stator, it should be appreciated that the term stator herein refers also to the housing of the electric motor. In one exemplary embodiment, the interface plate 26 is molded out of plastic and is fixed to the stator 22.

The interface plate 26 is configured and adapted to connect the electric motor 20 to a conventional liquid pump, such as a water pump. The interface plate 26 has opposite front 30 and back 32 sides, a top portion 34, and a bottom portion 36. The back side 32 of the interface plate 26 mates with the stator 22. Fasteners, such as bolts 38, secure the interface plate 26 to the stator 22. The shaft 28 of the rotor 24 extends through a shaft opening 40 of the interface plate 26. The interface plate 26 also optionally comprises a plurality of bolt holes 42 that are configured and adapted to secure the electric motor 20 to an appliance. A cavity 44 extends into the interface plate 26 from the interface plate's front side 30. The cavity 44 is generally cylindrical and is aligned with the rotor shaft 28. The cavity 44 provides an annular space around the rotor shaft 28. A channel 46 is formed into the front side 30 of the interface plate 26 and extends vertically upward from the cavity 44. The channel 46 creates a ventilation passageway 48 that operatively connects the cavity 44 to the environment that surrounds the electric motor 20. The bottom portion 36 of the interface plate 26 comprises a fluid discharge portion 50 which is configured to drip liquid from the interface plate. The fluid discharge portion 50 comprises a lowermost surface 52 that faces downward. The front side 30 of the interface plate 26 also comprises a pair of parallel ridges 54 that extend down from the cavity 44 to the lowermost surface 52 of the fluid discharge portion 50. The ridges 54 form a drainage channel 56 therebetween that is configured to guide liquid from the cavity 44 to the lowermost surface 52. As shown most clearly in FIG. 4, the lowermost surface 52 of the fluid discharge portion 50 lies below the stator 22 and a surface 58 extends upward along the back side 32 of the interface plate 26 from the lowermost surface 52. Still further, the interface plate 26 comprises a plurality of female bayonet connectors 60 that are configured and adapted to connect to male bayonet connectors (not shown) on a pump.

In use, the electric motor 20 operates with its rotor shaft rotating generally horizontal. A pump is attached to the electric motor 20 and the rotor shaft 28 extends into the pump for driving the pump's impeller. The bayonet connectors 60 of the electric motor 20 cooperate with bayonet connectors on the pump two maintain the pump and the electric motor in proper position relative to each other. The pump typically comprises a generally cylindrical wall that encircles the rotor shaft 28 and extends into the cavity 44 of the electric motor's interface plate 26. This prevents dust and debris from interfering with the rotor shaft 28 and bearings. Although the cylindrical wall of the pump extends into the cavity 44 of the interface plate 26, it should be appreciated that it does not completely fill the cavity and an annular void is maintained around the rotor shaft 28. It should also be appreciated that the cylindrical wall of the pump is configured so as not to block the ventilation passageway 48 or the drainage channel 56 from communicating with the cavity 44. In the event that liquid escapes from the pump through the bearing or bushings through which the rotor shaft 28 passes into the pump, such liquid will migrate to the bottom of the cavity 44 of the interface plate 26, and then pass into the drainage channel 56. Although the drainage channel 56 is closed only on three sides, the cohesion tension of the liquid and capillary action will cause the draining liquid to stay within the channel as it travels downward along the channel to the fluid discharge portion 50 of the interface plate 26. When the liquid reaches the lowermost surface 52 of the fluid discharge portion 50, it accumulates until enough liquid collects to drip off of the lowermost surface and away from the electric motor 20. The upwardly extending surface 58 on the back side 32 of the interface plate 26 prevents the liquid from migrating off of the lowermost surface 52 and reaching stator 22, where it could negatively impact the efficient operation of the electric motor. The ventilation passageway 48 keeps the pressure within the cavity 44 of the interface plate 26 equal to the ambient air pressure in the environment surrounding the electric motor 20, thereby allowing the liquid to freely drain from the cavity.

In view of the foregoing, it should be appreciated that the invention achieves the several advantages over prior art electric motors.

As various modifications could be made in the constructions and methods herein described and illustrated without departing from the scope of the invention, it is intended that all matter contained in the foregoing description or shown in the accompanying drawings shall be interpreted as illustrative rather than limiting. For example, while the drainage and ventilation passageways of the embodiment described above are exposed channels, they could alternatively be cylindrical drill hole passageways. Thus, the breadth and scope of the present invention should not be limited by any of the above-described exemplary embodiments, but should be defined only in accordance with the following claims appended hereto and their equivalents.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed.

What is claimed is:

1. An electric motor comprising:
   a stator;
   a rotor, the rotor having a rotor shaft;
   an interface plate, the interface plate being fixed to the stator and configured and adapted to couple the electric motor to a pump, the interface plate comprising a shaft opening, a cavity, a ventilation passageway, a fluid discharge portion, a drainage passageway, and an upwardly extending surface, the shaft opening extending horizontally through the interface plate, the rotor shaft extending horizontally through the shaft opening, the cavity being in fluid communication with the shaft opening, the ventilation passageway extending upward from the cavity and being in fluid communication with the cavity and with an environment that is external to the interface plate, the drainage passageway extending downward from the cavity and being in fluid communication with the cavity, the drainage passageway and ventilation passageway being configured and adapted in manner such that the drainage passageway is able to channel liquid downward from the cavity and to the fluid discharge portion via gravity while air is drawn into the cavity via the ventilation passageway, the upwardly extending surface extending upwardly from the fluid discharge portion and being positioned where the upwardly extending surface will inhibit liquid from migrating from the fluid discharge portion to the stator.

2. An electric motor in accordance with claim 1 wherein the cavity of the interface plate encircles the rotor shaft.

3. An electric motor in accordance with claim 1 wherein the rotor shaft has a center axis about which the rotor shaft is configured to rotate and the ventilation passageway and the drainage passageway are centered about a vertical plane that includes the center axis.

4. An electric motor in accordance with claim 1 wherein the fluid discharge portion has a lowermost surface portion and the drainage passageway extends to the lowermost surface portion.

5. An electric motor in accordance with claim 4 wherein the lowermost surface portion of the fluid discharge portion is lower than the stator.

6. An electric motor in accordance with claim 1 wherein the interface plate comprises opposite front and rear sides, the interface plate is mounted to the stator in a manner such that the rear side of the interface plate faces the stator, and the ventilation passageway is a groove in the front side of the interface plate.

7. An electric motor in accordance with claim 1 wherein the upwardly extending surface extends vertically.

8. An electric motor in accordance with claim 1 wherein the front side of the interface plate comprises two protruding parallel ridges and the drainage passageway is a trough extending therebetween.

9. An electric motor in accordance with claim 1 wherein the interface plate comprises opposite front and rear sides, the interface plate is mounted to the stator in a manner such that the rear side of the interface plate faces the stator, the ventilation passageway is a groove in the front side of the interface plate, the cavity of the interface plate extends into the interface plate from the front side of the interface plate and encircles the shaft opening, the fluid discharge portion has a lowermost surface portion, the drainage passageway extends to the lowermost surface portion, and the lowermost surface portion of the fluid discharge portion is lower than the stator.

10. An electric motor comprising:
a stator;
a rotor, the rotor having a rotor shaft;
an interface plate, the interface plate comprising opposite front and rear sides, a shaft opening, a cavity, a ventilation channel, and a drainage channel, the interface plate being mounted to the stator in a manner such that the rear side of the interface plate faces the stator, the shaft opening extending horizontally through the interface plate from the rear side to the front side of the interface plate, the rotor shaft extending horizontally through the shaft opening, the cavity extending partially into the interface plate from the front side of the interface plate, at least a portion of the cavity being beneath the shaft opening, the cavity being in fluid communication with the shaft opening, the ventilation channel extending at least partially through the interface plate from the front side of the interface plate and extending upward from the cavity, the ventilation channel being in fluid communication with the cavity and with an environment that is external to the interface plate, the drainage channel extending partially through the interface plate from the front side of the interface plate and extending downward from the cavity, the drainage channel being in fluid communication with the cavity and with the environment.

11. An electric motor in accordance with claim 10 wherein the cavity is annular and encircles the rotor shaft.

12. An electric motor in accordance with claim 11 wherein the ventilation channel is centered about a vertical plane.

13. An electric motor in accordance with claim 10 wherein the electric motor has a lowermost surface portion and the drainage channel extends to the lowermost surface portion.

14. An electric motor in accordance with claim 13 wherein the back side of the interface plate comprises an upwardly extending surface that extends from the lowermost surface portion of the electric motor, and the lowermost surface portion of the electric motor is lower than the stator.

15. An electric motor in accordance with claim 10 wherein the rotor shaft has a center axis about which the rotor shaft is configured to rotate and the ventilation channel and the drainage channel are centered about a vertical plane that includes the center axis.

* * * * *